(12) United States Patent
Monpratarnchai et al.

(10) Patent No.: US 10,055,341 B2
(45) Date of Patent: Aug. 21, 2018

(54) TO-BE-STUBBED TARGET DETERMINING APPARATUS, TO-BE-STUBBED TARGET DETERMINING METHOD AND NON-TRANSITORY RECORDING MEDIUM STORING TO-BE-STUBBED TARGET DETERMINING PROGRAM

(71) Applicant: FUJITSU LIMITED, Kawasaki-shi, Kanagawa (JP)

(72) Inventors: Supasit Monpratarnchai, Suginami (JP); Tadahiro Uehara, Yokohama (JP); Hideo Tanida, Kawasaki (JP); Asako Katayama, Kawasaki (JP); Yusuke Sasaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 148 days.

(21) Appl. No.: 15/172,334

(22) Filed: Jun. 3, 2016

(65) Prior Publication Data
US 2017/0052887 A1    Feb. 23, 2017

(30) Foreign Application Priority Data

Aug. 21, 2015  (JP) ................. 2015-164051

(51) Int. Cl.
*G06F 11/00*   (2006.01)
*G06F 11/36*   (2006.01)

(52) U.S. Cl.
CPC ...... *G06F 11/3692* (2013.01); *G06F 11/3688* (2013.01)

(58) Field of Classification Search
CPC .................................................. G06F 11/3692
See application file for complete search history.

(56) References Cited

U.S. PATENT DOCUMENTS

| | | | | |
|---|---|---|---|---|
| 6,895,578 B1* | 5/2005 | Kolawa | ............... | G06F 11/3624 714/E11.209 |
| 7,107,182 B2* | 9/2006 | Fujikawa | ............ | G06F 11/3672 702/108 |
| 7,392,507 B2* | 6/2008 | Kolawa | ............... | G06F 11/3624 714/E11.209 |
| 9,038,028 B1* | 5/2015 | Micklavzina | ....... | G06F 11/3696 717/124 |
| 9,223,554 B1* | 12/2015 | Lawson | .................... | G06F 8/53 |
| 9,317,405 B2* | 4/2016 | Yoshida | .............. | G06F 11/3684 |

FOREIGN PATENT DOCUMENTS

| | | |
|---|---|---|
| JP | 9-265414 | 10/1997 |
| JP | 2009-129133 | 6/2009 |
| JP | 2012-181666 | 9/2012 |

* cited by examiner

*Primary Examiner* — Christopher S McCarthy
(74) *Attorney, Agent, or Firm* — Fujitsu Patent Center

(57) ABSTRACT

A to-be-stubbed target determining apparatus includes: a processor that executes a determining program; and a memory that stores the determining program; wherein according to determining program, the processor: extracts relational information that represents a relation between a program under test and one or more functions which are called from the program under test; and determines, according to the relational information, from among the one or mode functions, a function that returns a user-defined type of instance accessed in the program under test and a function that returns a value used as a condition of a conditional branch in the program under test, as a first function excluded from functions to be stubbed.

9 Claims, 19 Drawing Sheets

FIG. 10

```
                    31
    void target(String s, int x) {
1:     int a = 0;
2:     MyNum num = method1(s);
3:     int b = num.n;
4:     int c = b * x;
5:     method2(b);
6:     if(c>0)
7:        a = method3(s, x);
8:     else if(s.length()>0)
9:        c = method4(s, x);
10:    if(a >0)
11:       System.out.println("foo");
    }
```

FIG. 11

| LINE | PAIR TO BE ADDED TO VML SET | DESCRIPTION |
|---|---|---|
| 2 | [method1, s] | VARIABLE s IS PASSED TO method1 AS ARGUMENT. |
| | [num, method1] | method1 RETURNS VALUE TO VARIABLE num. |
| 3 | [b, num] | RESULT OBTAINED WHEN VARIABLE b PROCESSES VARIABLE num. |
| | [line 3, num] | VARIABLE num IS ACCESSED ON LINE 3. |
| 4 | [c, b], [c, x] | RESULT OBTAINED WHEN VARIABLE c PROCESSES VARIABLES b AND x. |
| 5 | [method2, b] | VARIABLE b IS PASSED TO method2 AS ARGUMENT. |
| 6 | [line 6, c] | VARIABLE c IS USED ON LINE 6. |
| 7 | [method3, s], [method3, x] | VARIABLES s AND x ARE PASSED TO method3 AS ARGUMENT. |
| | [a, method3] | method3 RETURNS VALUE TO VARIABLE a. |
| 8 | [line 8, s] | VARIABLE s IS ACCESSED ON LINE 8. |
| 9 | [method4, s], [method4, x] | VARIABLES s AND x ARE PASSED TO method3 AS ARGUMENT. |
| | [c, method4] | method4 RETURNS VALUE TO VARIABLE c. |
| 10 | [line 10, a] | VARIABLE a IS USED ON LINE 10. |

FIG. 14

| LINE 3 → num → method1 → s |
| LINE 6 → c → method4 → s |
| LINE 6 → c → method4 → x |
| LINE 6 → c → b → num |
| LINE 6 → c → x |
| LINE 8 → s |
| LINE 10 → a → method3 → s |
| LINE 10 → a → method3 → x |

```
    int method3(String s, int x) {
1:      boolean isTrue=methodB(x);
2:      if(s.length()==0 && isTrue)
3:        return 0;
4:      else
5:        return methodC(x);
    }
```

FIG. 17

| LINE | PAIR TO BE ADDED TO VML SET | DESCRIPTION |
|---|---|---|
| 1 | [methodB, x] | VARIABLE x IS PASSED TO methodB AS ARGUMENT. |
| | [isTrue, methodB] | methodB RETURNS VALUE TO VARIABLE is True. |
| 2 | [line 2, s] [line 2, is True] | VARIABLES s AND is True ARE USED ON LINE 2. |
| 5 | [methodC, x] | VARIABLE x IS PASSED TO methodC AS ARGUMENT. |
| | [$\mu$, methodC] | VALUE RETURNED FROM methodC BECOMES VALUE $\mu$ THAT IS USED DIRECTLY BY METHOD UNDER TEST. |

TO-BE-STUBBED TARGET DETERMINING APPARATUS, TO-BE-STUBBED TARGET DETERMINING METHOD AND NON-TRANSITORY RECORDING MEDIUM STORING TO-BE-STUBBED TARGET DETERMINING PROGRAM

CROSS-REFERENCE TO RELATED APPLICATION

This application is based upon and claims the benefit of priority of the prior Japanese Patent Application No. 2015-164051, filed on Aug. 21, 2015, the entire contents of which are incorporated herein by reference.

FIELD

The embodiment discussed herein is related to a to-be-stubbed target determining apparatus, a to-be-stubbed target determining method, and a non-transitory recording medium storing a to-be-stubbed target determining program.

BACKGROUND

In a test technology of a program based on a symbolic execution technology, a test case is created.

Related technologies are disclosed in Japanese Laid-open Patent Publication No. 2009-129133, Japanese Laid-open Patent Publication No. 9-265414, and Japanese Laid-open Patent Publication No. 2012-181666.

SUMMARY

According to an aspect of the embodiments, a to-be-stubbed target determining apparatus includes: a processor that executes a determining program; and a memory that stores the determining program; wherein according to determining program, the processor: extracts relational information that represents a relation between a program under test and one or more functions which are called from the program under test; and determines, according to the relational information, from among the one or mode functions, a function that returns a user-defined type of instance accessed in the program under test and a function that returns a value used as a condition of a conditional branch in the program under test, as a first function excluded from functions to be stubbed.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 illustrates an example of a method under test;

FIG. 11 illustrates examples of pairs to be added to a VML set;

FIG. 12 illustrates examples of sequences of connected pairs that have been searched for;

FIG. 13 is an example of a graph representing sequences of connected pairs that have been searched for;

FIG. 14 illustrates examples of lists of elements;

FIG. 15 illustrates examples of following sequences of connected pairs that have been searched for;

FIG. 16 illustrates an example of a method under test that has been newly set;

FIG. 17 illustrates examples of pairs, in the newly set method under test, that are to be added to the VML set;

DESCRIPTION OF EMBODIMENTS

Figure 1:
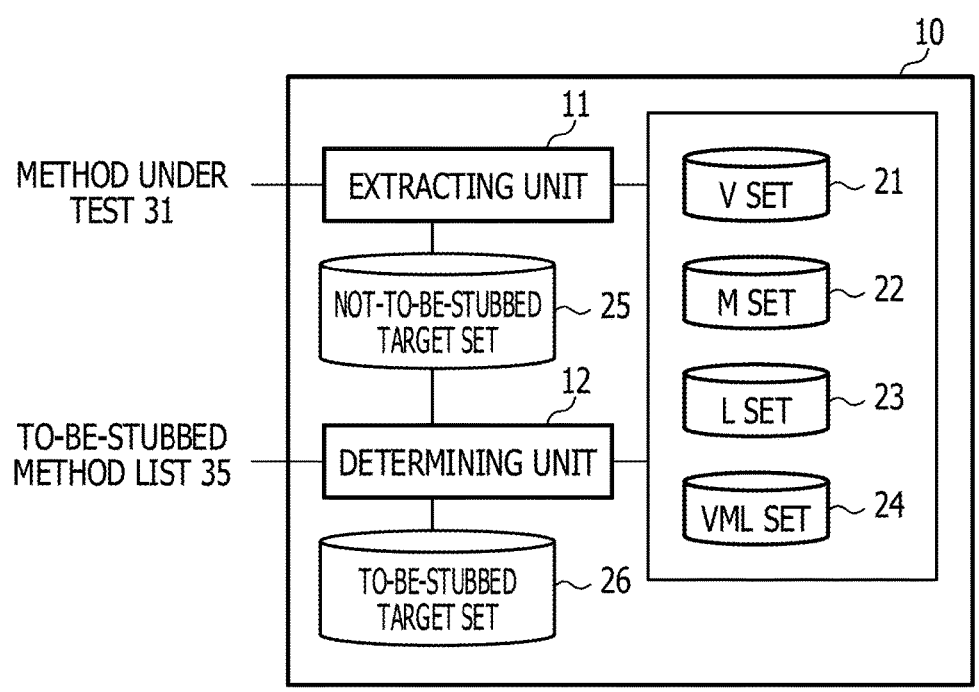
FIG. 1 is an example of a functional block diagram of a to-be-stubbed target determining apparatus.

For example, when a test case is created, a driver that creates and sets a test environment and a stub, which is a dummy implementation of a program part that is called from a program under test, are prepared.

For example, a system may have a module execution feature that executes a module under test, a dependent module called from the module under test, and a stub that executes a procedure intended to be executed by the dependent module on behalf of it according to coding of the module under test, dependent module, and the stub. The module execution feature includes a processing transfer feature that detects a call from the module under test to the dependent module, selects the dependent module or the stub as a module that executes calling processing according to a certain condition, and causes the dependent module or the stub, whichever has been selected, to execute the calling processing.

For example, the system may have a test pattern display feature, a feature that extracts a calling relationship of function from a test pattern, and a feature that checks a function that has been already determined as to whether it will be used as a stub or a real function. The system further has a feature that presents a function, called from a real function, that has not been determined as to whether it will be used as a stub or a real function and stores settings made by a person responsible for setting a test environment. The system also has a feature that creates information used to make a test executable according to the selective use between a stub and a real function.

For example, an information processing apparatus may accept a target program and information about a path on the target program and may create a stub program representing a change in accordance with path information about a variable value that is updated by an external program that is called from the target program. This apparatus creates a target program under test in which a call from the target program to the external program is replaced with a call from the target program to the stub program and also creates a driver program that calls the target program under test by using an initial value of the path information.

In a test technology of program based on a symbolic execution technology, a driver used to create a test case is created directly from a program under test. As for stubbing, a determination is made for each function which is called from the program under test as to whether the function is a target to be stubbed. For example, some functions which are called from the program under test have a structure that is difficult to analyze. For these functions, a correct determination may not be made as to whether the function is a target to be stubbed. If it is not simple for a called function to be stubbed due to the difficulty of making a determination as to whether the function is a target to be stubbed like this, paths may be explosively increased during test case creation. For example, if all called functions are stubbed, the code coverage of test cases to be created may be lowered.

Figure 2:
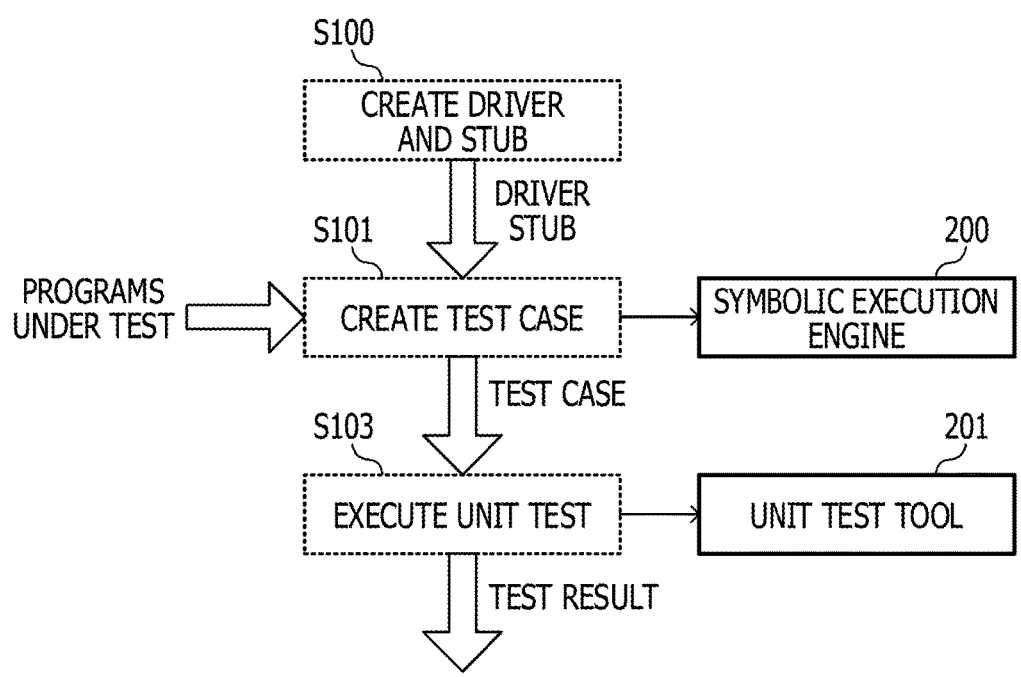
FIG. 2 illustrates an example of creating a symbolic driver and a stub in symbolic execution.

FIG. 2 illustrates an example of creating a symbolic driver and a stub in symbolic execution. As illustrated in FIG. 2, a symbolic driver and a stub are first created (S100). A symbolic driver is a program that creates and sets an environment in which a program under test is executed and activates the program under test. A stub is a dummy implementation of a program part that is called from the program under test. During a test of the program under test, the program part that is called from the program under test may be in the middle of implementation or the program part has not been tested. The program part may be intended to make an external access to a file, a database, or the like. If the program part that is called from the program under test fails to be used due to these reasons, a stub is used instead of the actual program part.

The created symbolic driver and stub and programs under test are input to a symbolic execution engine 200 and a test case is created in the symbolic execution engine 200 (S101). When a unit test tool 201 executes a test by using the created test case, a test result about each program under test is obtained (S103).

Figure 3:
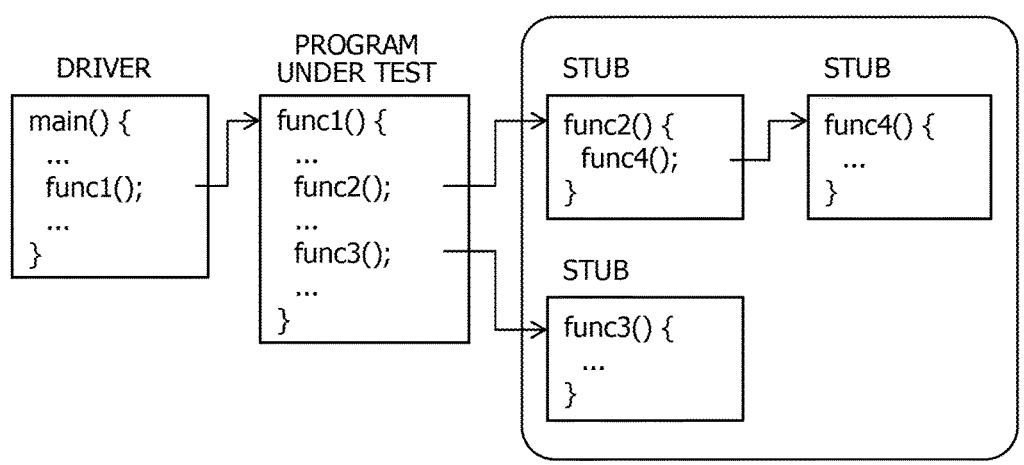
FIG. 3 illustrates an example of a calling relationship among a program under test, a symbolic driver, and stubs.

FIG. 3 illustrates an example of a calling relationship among a program under test, a symbolic driver, and stubs. As illustrated in FIG. 3, a program under test is executed by a symbolic driver. When a function is called from the program under test, a created stub is called and a value is returned from the stub to the program under test. If, for example, the branch destination of a conditional branch in the program under test differs depending on a value returned from a stub, variations are made in created stubs so that test cases corresponding to all possible branch patterns can be created. Stubs of this type are manually created, so a high work cost may be involved.

To reduce the stub creation cost, some of the functions that is called from the program under test may not be stubbed. In this case, if many functions are called or the program includes many conditional branches, paths may be explosively increased during symbolic execution. Due to an explosive increase in paths, the symbolic execution may not be terminated or may fail.

Figure 4:
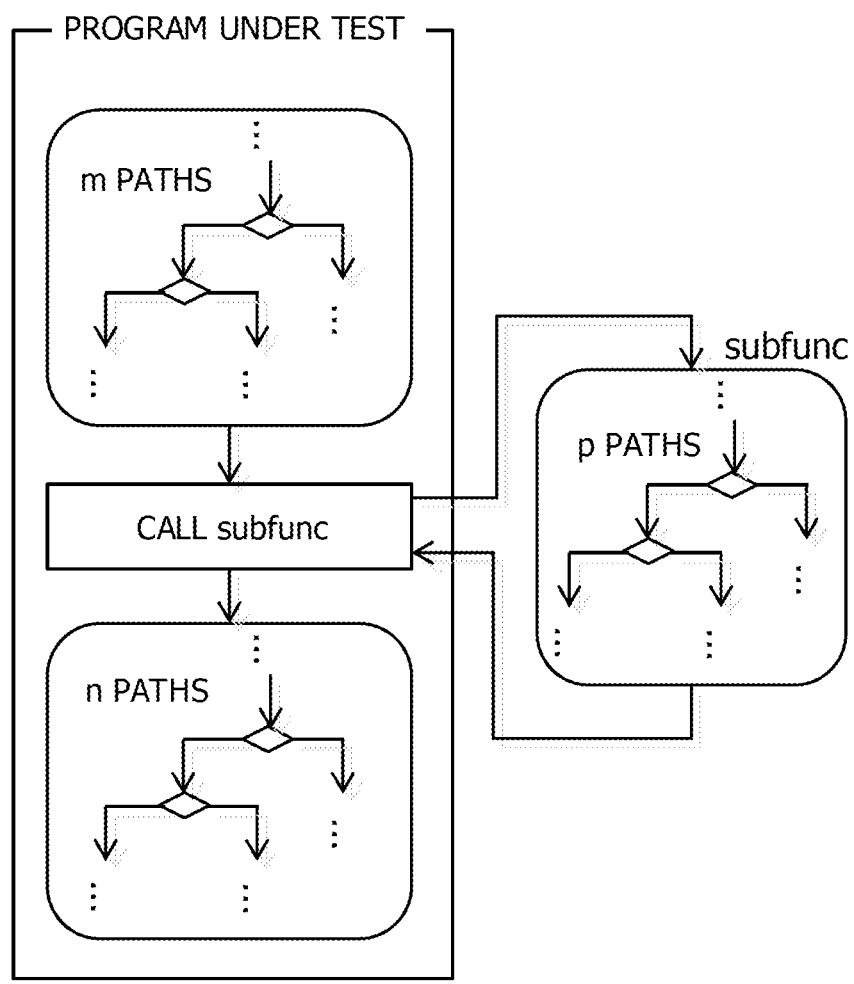
FIG. 4 illustrates an example of execution paths when a call of a function is included.

FIG. 4 illustrates an example of execution paths when a call of a function is included. As illustrated in, for example, FIG. 4, a program under test including a call of a function "subfunc" includes m paths in execution before subfunc is called and n paths in execution after subfunc has been called.

It will be assumed that called subfunc includes p paths and a value returned from subfunc does not affect execution of the program under test.

When subfunc is to be stubbed, paths executed in subfunc are not preferably listed. Therefore, the total number of execution paths including functions called in the program under test is m by n (m×n). If none of the functions are stubbed, subfunc is not stubbed. Since paths executed in subfunc are listed, the total number of execution paths in the program under test is m by p by n (m×n×p). If, for example, subfunc is not stubbed, p times as many paths are listed when compared with as a case in which subfunc is stubbed. If the values of m, n, and p are large, paths may be explosively increased. Therefore, to efficiently execute a test, it may be preferable for subfunc to be stubbed.

Figure 5:
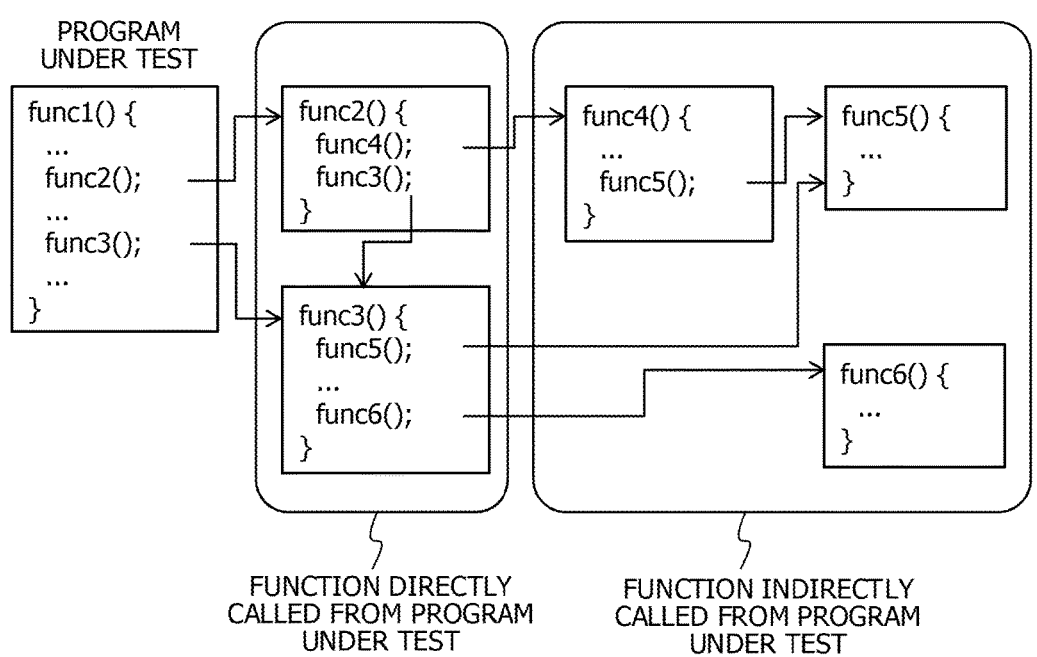
FIG. 5 illustrates an example in a case in which all functions called directly from a program under test are stubbed.
Figure 6:
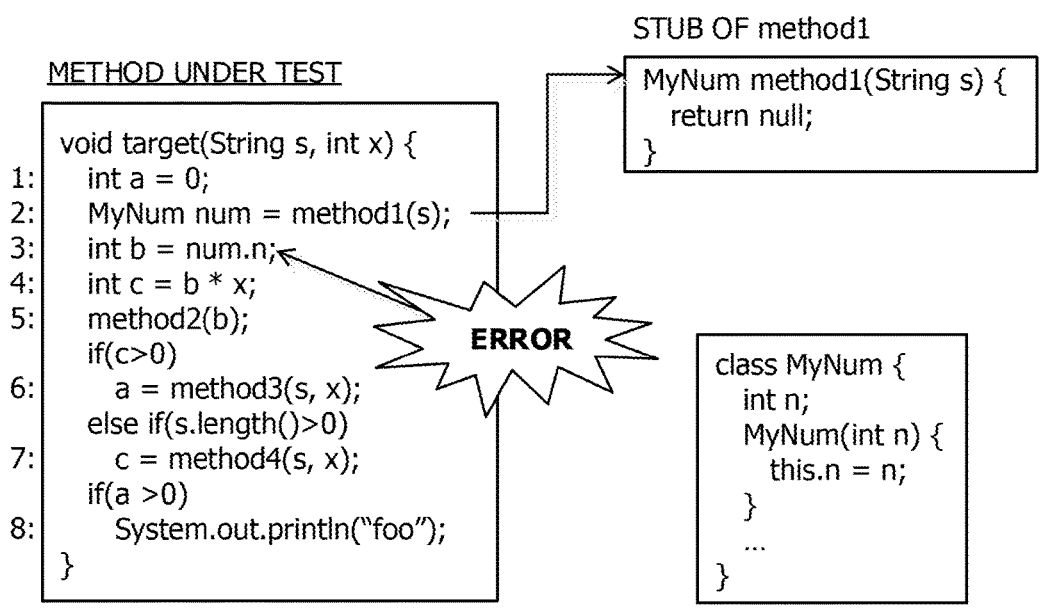
FIG. 6 illustrates an example in a case in which all functions called directly from a program under test are stubbed.

FIGS. 5 and 6 each illustrate an example in a case in which all functions that are called directly from a program under test are stubbed. In contrast to the policy that none of the functions are stubbed, all functions that are called directly from the program under test may be stubbed as illustrated in FIG. 5, assuming that these functions are external functions. As illustrated in FIG. 5, when functions that are called directly from the program under test are stubbed, functions that are called indirectly from the program under test are not stubbed but are not executed during a test. A function that is called indirectly from the program under test is a function that is called from a function to be stubbed or a subsequent function called from the called function.

If all functions that are called are to be stubbed, a problem as described below, for example, may arise. As illustrated in, for example, FIG. 6, a method coded in JavaScript (registered trademark) may be a method under test. In FIG. 6, in the method under test, method1 is called on line 2, method1 returns a user-defined object as a return value, and the return value is used on line 3.

If a return value returned from a method is of a user-defined object type, it may be difficult to dynamically analyze the object type. Therefore, when this method is stubbed, variations of stubs are not created but a stub that returns a null value is created. Accordingly, when method1 that is called from the method under test in FIG. 6 is stubbed, the value returned on line 2 is a null value. In this case, even if the value returned from the stub is used on line 3, an access to an internal method or a member of the object that is returned with a null value fails, in which case an error occurs on line 3 during test execution. As a result, of all the eight lines in the program under test, only two lines (lines 1 and 2) are executed and the subsequent six lines are not executed. Therefore, test code coverage may be as low as 25% (=2/8×100).

In consideration of a case in which all functions are stubbed and and a case in which none of all functions are stubbed, functions that affect processing of the program under test is searched for and are identified. The identified functions are excluded and the remaining functions are determined as functions to be stubbed. The functions identified as affecting processing of the program under test include a function that returns a user-defined type of instance accessed in the program under test and a function that returns a value used as a condition of a conditional branch in the program under test.

A method in which a program under test is coded in JavaScript (registered trademark) is proposed.

FIG. 1 is an example of a functional block diagram of a to-be-stubbed target determining apparatus. As illustrated in FIG. 1, a to-be-stubbed target determining apparatus 10 accepts a method-under-test 31 as an input. The to-be-stubbed target determining apparatus 10 determines whether the method called from the method-under-test 31 can be stubbed and outputs methods to be stubbed as a to-be-stubbed method list 35.

The to-be-stubbed target determining apparatus 10 may functionally include an extracting unit 11 and a determining unit 12 as illustrated in FIG. 1.

The extracting unit 11 extracts relational information that represents a relation between the method-under-test 31 and a method that is called from the method-under-test 31. For example, the extracting unit 11 extracts variables included in the method-under-test 31 and adds the extracted variables to a V set 21, which is a set of variables. Variables to be extracted are parameters in the method-under-test 31, variables to be symbolized such as global variables, and all local variables in the method-under-test 31. The extracting unit 11 extracts a method that is called directly from the method-under-test 31 and adds the extracted method to an M set 22, which is a set of methods. The extracting unit 11 extracts the line number of a line on which execution of a conditional branch is indicated in a statement in the method-under-test 31, and adds the extracted line number to an L set 23, which is a set of line numbers. The extracting unit 11 extracts the line number of a line on which an access to a user-defined object returned from a method included in the M set 22 is indicated in a statement in the method-under-test 31, and adds the extracted line number to the L set 23.

The extracting unit 11 extracts pairs of related elements from variables included in the V set 21, methods included in the M set 22, and line numbers included in the L set 23 according to predetermined rules, and adds the extracted pairs to a VML set 24. Information added to the VML set 24 may be an example of the relational information. Pairs of related elements include a pair of mutually related variables, a pair of mutually related methods, a pair of a variable and a method that are mutually related, a pair of a line number and a variable that are mutually related, and a pair of a line number and a method that are mutually related. Examples of the rules according to which pairs are extracted are described below.

(1) When variable "v" has processed variable "w", pair [v, w] is added to VML set 24.

(2) When method "m" is called as an argument of method "n", pair [m, n] is added to VML set 24.

(3) When variable "v" is passed to method "m" as an argument, pair [m, v] is added to VML set 24.

(4) When method "m" returns a value to variable "v", pair [v, m] is added to VML set 24.

(5) When, on line "i", an access to variable "v" is indicated or variable "v" is used, pair [i, v] is added to VML set 24.

(6) When a call of method "m" is included in the statement on line pair [i, m] is added to VML set 24.

Processing of the extracting unit 11 may be executed by, for example, ASM or another analysis engine.

The determining unit 12 determines methods to be stubbed from methods called from the method-under-test 31 according to information included in the VML set 24. For example, the determining unit 12 determines, as methods to be stubbed, a method that returns a user-defined object accessed in the method-under-test 31 and a method the returns a value used as a condition of a conditional branch in the method-under-test 31. For example, in the method-under-test 31, the determining unit 12 identifies a variable included in a statement on a line on which an access to a user-defined object or execution of a conditional branch is indicated or identifies a method that is called from the statement. The determining unit 12 determines a method obtained by performing a sequential trace of the identified variable or method according to information included in the VML set 24 as methods that are not to be stubbed.

For example, the determining unit 12 searches, from each of the pairs included in the VML set 24, for pair [a, b] that uses line number "a" included in the L set 23 as a first element. The determining unit 12 then searches, from each of the pairs included in the VML set 24, for pair [b, c] that uses the second element "b" of pair [a, b] as a first element. In the description below, when the second element of one of two pairs is used as a first element, the other of two pairs may be referred to as the connected pair of the one of two pairs. The connected pairs are searched sequentially in the same way until no more connected pair is present. The determining unit 12 determines each method that is included as an element in a searched-for pair as a method that is not to be stubbed. The determining unit 12 transfers methods, included in the M set 22, that have been determined not to be stubbed to a not-to-be-stubbed target set 25 and transfers the remaining methods to a to-be-stubbed target set 26.

The determining unit 12 sets a method, which is included in the not-to-be-stubbed target set 25 and further calls another method from the method, as a new method under test. The determining unit 12 empties all sets other than the to-be-stubbed target set 26 and recursively repeats processing to determine whether a method that is called from a method under test can be stubbed. The determining unit 12 finally determines all methods included in the to-be-stubbed target set 26 as methods to be stubbed, creates the to-be-stubbed method list 35 that lists identification information that identifies the methods to be stubbed, and outputs the to-be-stubbed method list 35.

Figure 7:
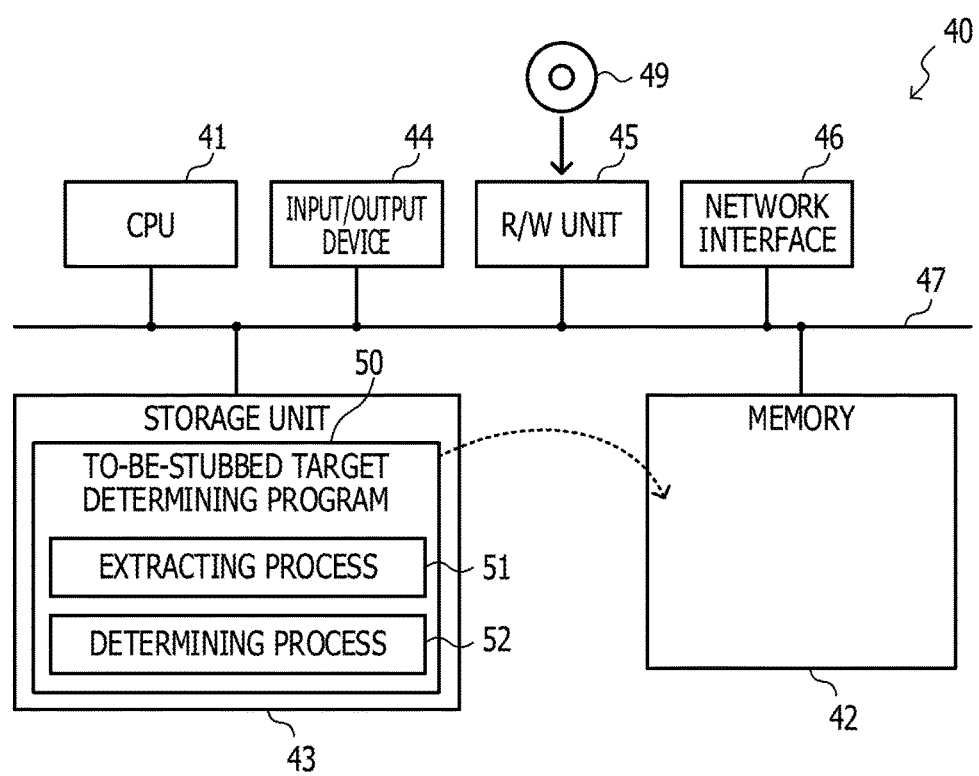
FIG. 7 illustrates an example of a computer.

FIG. 7 illustrates an example of a computer. The computer in FIG. 7 may function as the to-be-stubbed target determining apparatus 10. A computer 40 includes a central processing unit (CPU) 41, a memory 42, which works as a temporary storage area, and a storage unit 43, which is non-volatile. The computer 40 also includes an input/output device 44 such as a display device and an input device, a read/write (R/W) unit 45 that controls the reading of data from a recording medium 49 and the writing of data to it, and a network interface 46 coupled to the Internet or another network. The CPU 41, memory 42, storage unit 43, input/output device 44, R/W unit 45, and network interface 46 are mutually coupled through a bus 47.

The storage unit 43 may be implemented by a hard disk drive (HDD), a solid-stated drive (SSD), a flash memory, or the like. The storage unit 43, which is a recording medium, stores a to-be-stubbed target determining program 50 that causes the computer 40 to function as the to-be-stubbed target determining apparatus 10.

The CPU 41 reads out the to-be-stubbed target determining program 50 from the storage unit 43, develops the to-be-stubbed target determining program 50 in the memory 42, and sequentially executes processes included in the to-be-stubbed target determining program 50. The to-be-stubbed target determining program 50 has an extracting process 51 and a determining process 52. The CPU 41 works as the extracting unit 11 illustrated in FIG. 1 by executing the extracting process 51. The CPU 41 also works as the determining unit 12 illustrated in FIG. 1 by executing the determining process 52. This enables the computer 40 to function as the to-be-stubbed target determining apparatus 10 by executing the to-be-stubbed target determining program 50.

Functions implemented by the to-be-stubbed target determining program 50 may be implemented by, for example, a semiconductor integrated circuit such as, for example, an application-specific integrated circuit (ASIC).

Figure 8:
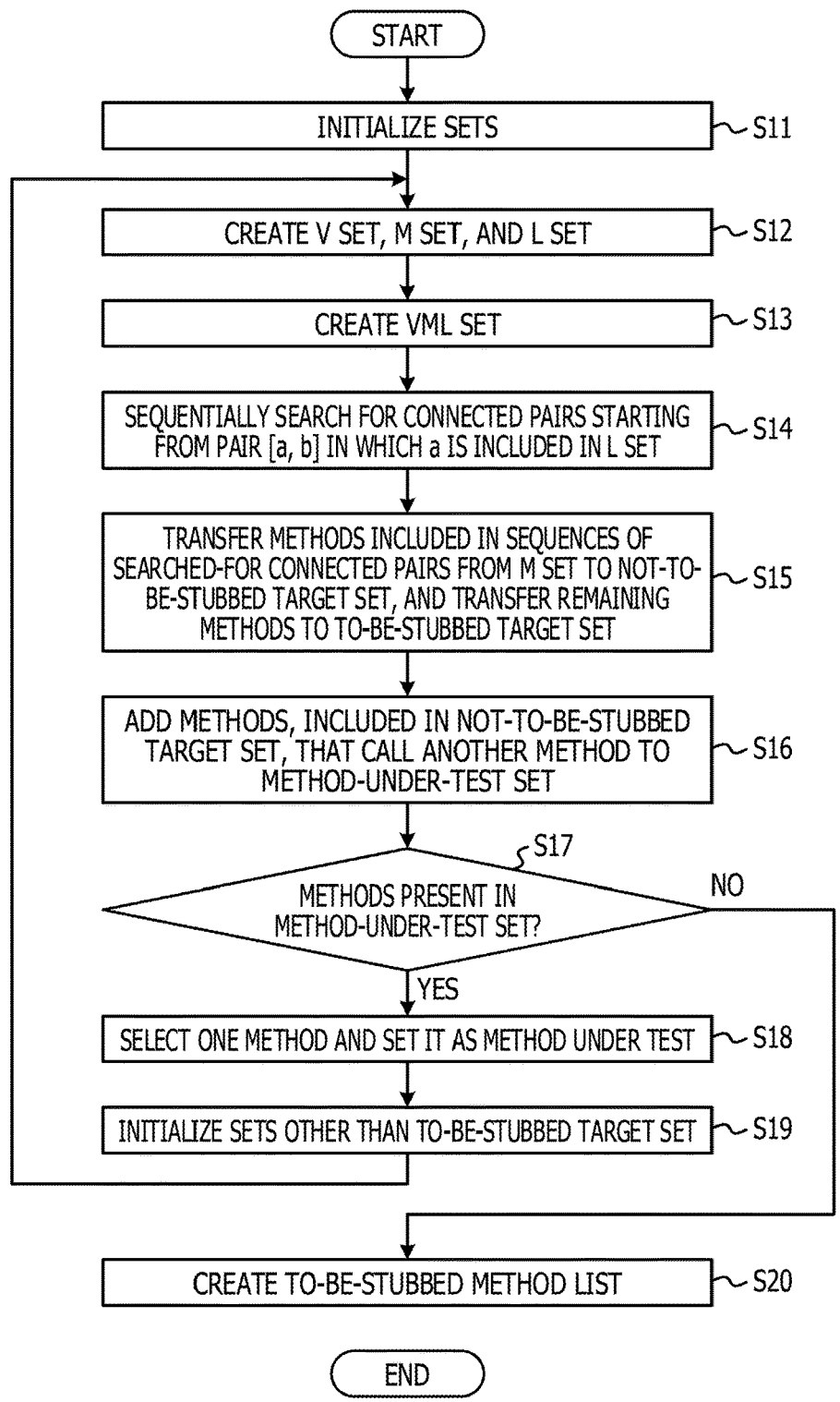
FIG. 8 illustrates an example of to-be-stubbed target determining processing.
Figure 9:
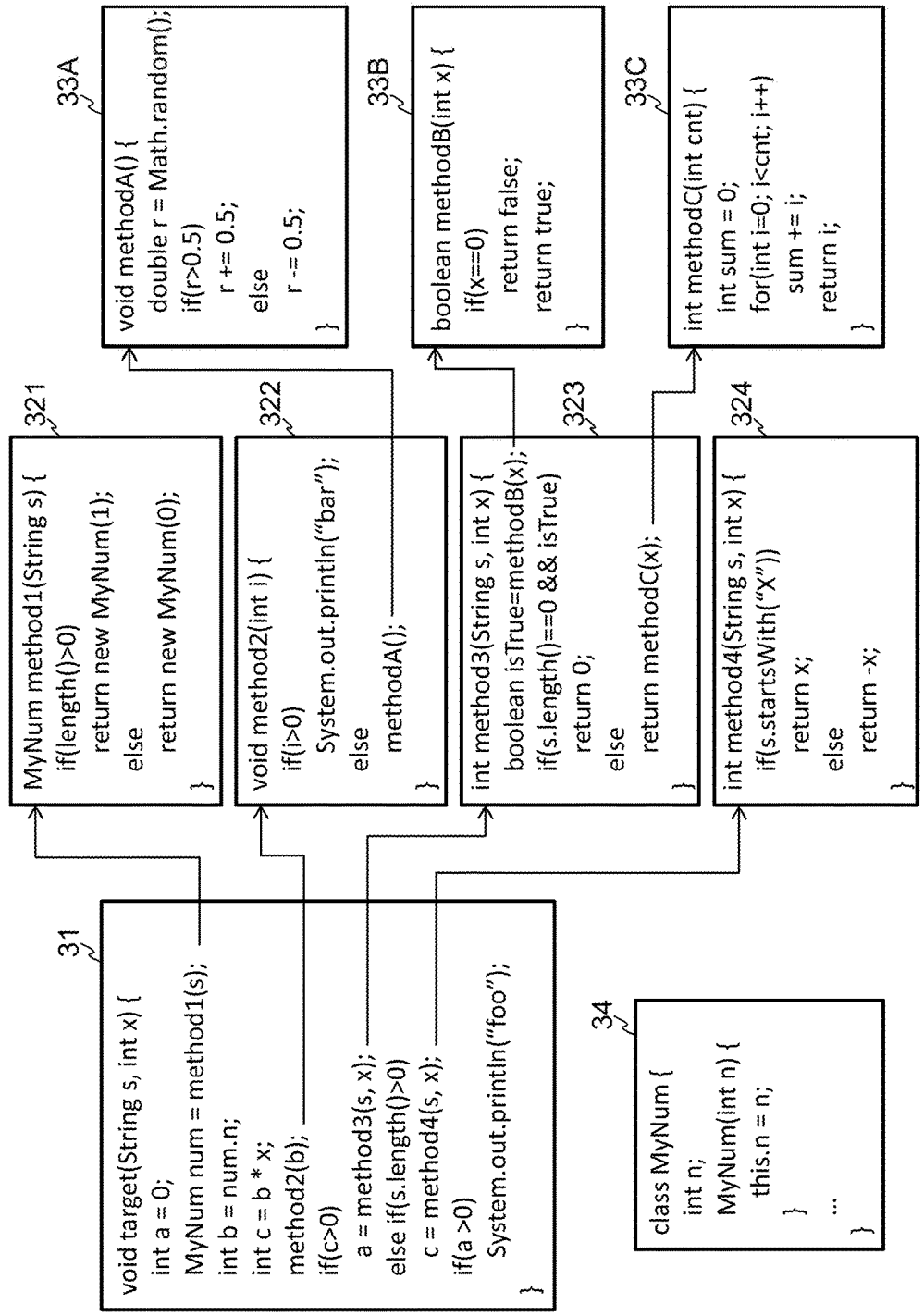
FIG. 9 illustrates an example of a method under test and examples of methods called from the method under test.

FIG. 8 illustrates an example of to-be-stubbed target determining processing. FIG. 9 illustrates an example of a method under test and examples of methods called from the method under test. When the method-under-test 31 is input to the to-be-stubbed target determining apparatus 10, the to-be-stubbed target determining process illustrated in FIG. 8 is executed in the to-be-stubbed target determining apparatus 10. For example, the method-under-test 31 as illustrated in FIG. 9 is input. Methods that are called directly from the method-under-test 31 are a method 321 (method1), a method 322 (method2), a method 323 (method3), and a method 324 (method4). A method 33A (methodA) that is called from the method 322 as well as a method 33B (methodB) and method 33C (methodC) that are called from the method 323 are included. An instance 34 of a user-defined object type, which is returned from method1, is included. FIG. 10 illustrates an example of a method under test. In the example in FIG. 10, line numbers are indicated beside the method-under-test 31. Parameters "s" and "x" in the method-under-test 31 are symbol variables.

In operation S11 in to-be-stubbed target determining processing illustrated in FIG. 8, the extracting unit 11 initializes (empties) each of the V set 21, M set 22, L set 23, VML set 24, not-to-be-stubbed target set 25, and to-be-stubbed target set 26.

In operation S12, the extracting unit 11 extracts variables included in the method-under-test 31 and adds the extracted variables to the V set 21. Symbol variables "s" and "x" and local parameters "a", "b", "c", and "num" are added to the V set 21. The extracting unit 11 extracts methods that are called directly from the method-under-test 31 and adds the extracted methods to the M set 22. For example, method1, method2, method3, and method4 are added to the M set 22. The extracting unit 11 extracts the line numbers of lines on which a conditional branch or an access to a user-defined object returned from a method included in the M set 22 is indicated in statements in the method-under-test 31, and adds the extracted line number to the L set 23. For example, line 3 on which an access to a user-defined object is indicated and lines 6, 8, and 10 on which a conditional branch is indicated are added to the L set 23.

In operation S13, the extracting unit 11 extracts pairs of related elements from variables included in the V set 21, methods included in the M set 22, and line numbers included in the L set 23 according to the rules described above, and adds the extracted pairs to the VML set 24. FIG. 11 illustrates examples of pairs to be added to a VML set. For example, pairs as illustrated in FIG. 11 are added to the VML set 24. For example, coding of "method1(s)" included in the statement on line 2 of the method-under-test 31 represents that variable "s" is to be passed to method1 as an argument. Therefore, this coding matches rule (3) above, so pair [method1, s] is extracted and is added to the VML set 24.

In operation S14, the determining unit 12 searches, from each of the pairs included in the VML set 24, for pair [a, b] that uses line number "a" included in the L set 23 as a first element. The determining unit 12 sequentially searches the VML set 24 for connected pairs after pair [a, b].

Figure 12:
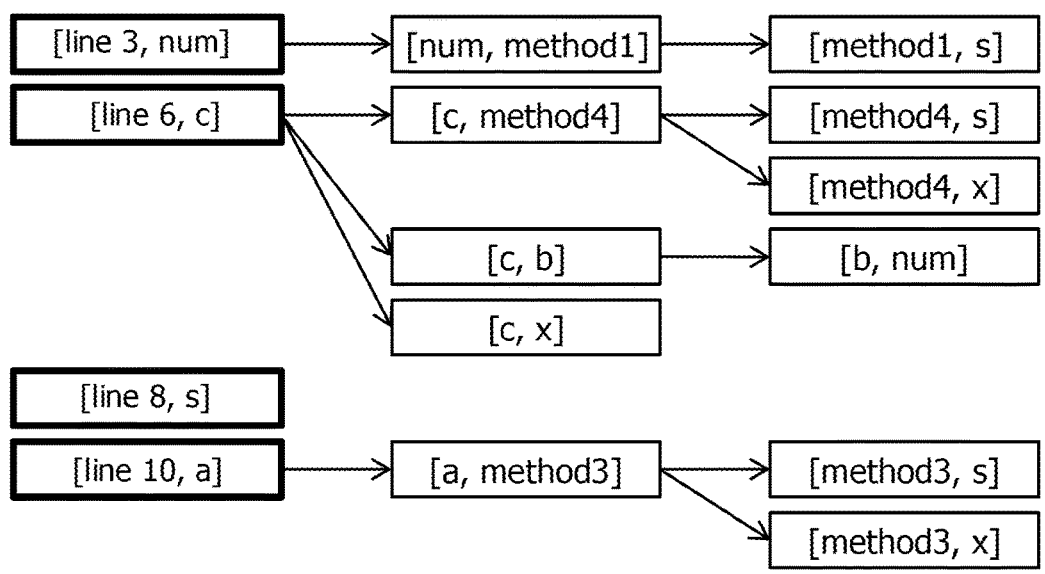

For example, as pair [a, b] in which line number "a" included in the L set 23 is the first element, pairs [line 3, num], [line 6, c], [line 8, s], and [line 10, a] are searched for. Pair [num, method1] is searched for as a connected pair of pair [line 3, num]. Pair [method1, s] is searched for as a connected pair of pair [num, method1]. FIG. 12 illustrates examples of sequences of connected pairs that have been searched for. As illustrated in FIG. 12, connected pairs are similarly searched for regarding connected pairs of pairs [line 6, c], [line 8, s], and [line 10, a].

Figure 13:
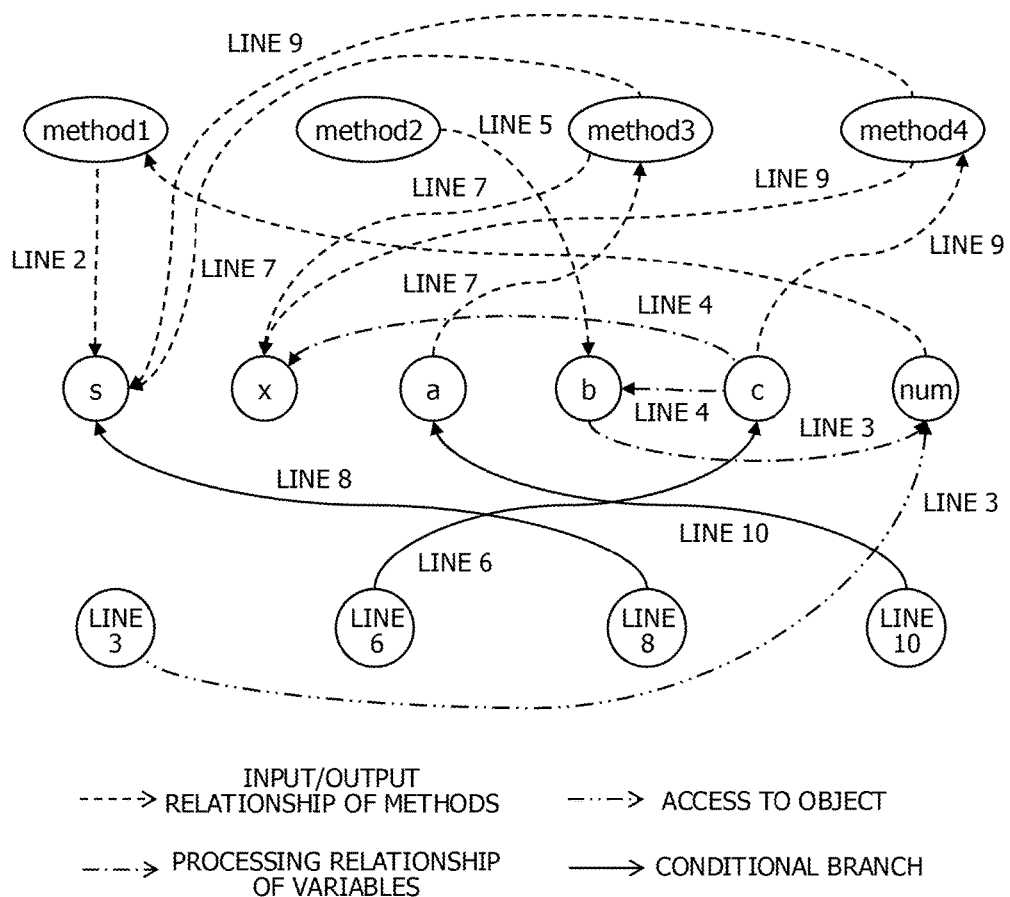

FIG. 13 is an example of a graph representing sequences of connected pairs that have been searched for. A sequence of connected pairs that starts from pair [a, b], searched for in operation S14, that uses line number "a" included in the L set 23 as a first element is represented as a graph in which elements included in each pair are nodes as illustrated in, for example, FIG. 13. In FIG. 13, each two nodes are connected with an edge that holds information representing a relationship between elements corresponding to the respective nodes. Information representing a relationship between elements may correspond to a rule applied to extract pairs in operation S13. For example, node denoted "method1" and node denoted "s" are interconnected with an edge representing an input/output relationship of the variable for the method because pair [method1, s] has been extracted according to rule (3) described above. A line number indicated beside an edge indicates the line number of a line from which the pair corresponding to the respective nodes connected with the edge has been extracted.

Figure 15:
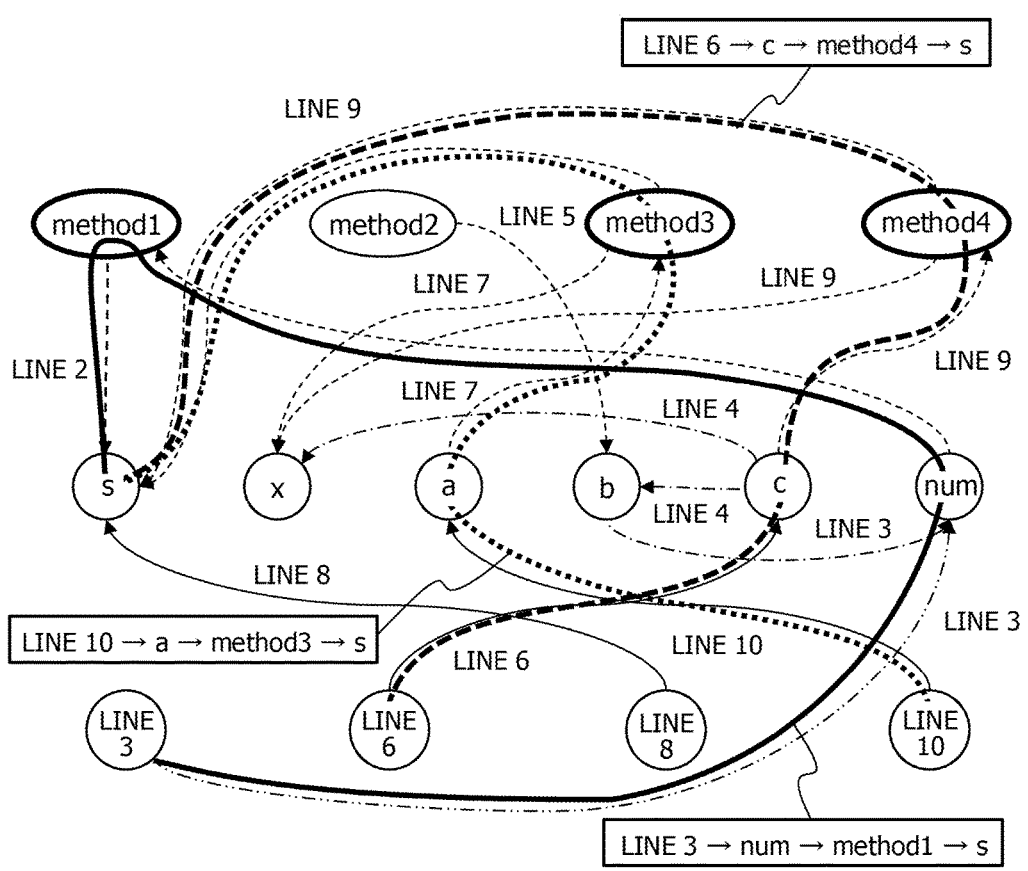

FIG. 14 illustrates examples of lists of elements. In FIG. 14, elements are listed that correspond to nodes in a case in which edge-connected nodes are sequentially followed starting from a node corresponding to a line number in the graph illustrated in FIG. 13. FIG. 15 illustrates examples of following sequences of connected pairs that have been searched for. In the example in FIG. 15, the nodes in the graph illustrated in FIG. 13 have been followed according to the lists of elements illustrated in FIG. 14. If a method is included in related methods or elements that have been sequentially followed starting from a line number included in the L set 23 as described above, the method may be a method that affects processing of the method-under-test 31. For example, the method may be a not-to-be-stubbed method that returns a user-defined object that is accessed in the method-under-test 31 or returns a value used as a condition of a conditional branch.

As described above, the graph in FIG. 13 represents sequences of connected pairs, as illustrated in FIG. 12, that start from pair [a, b] that uses line number "a" included in the L set 23 as a first element. Therefore, methods included in each of the sequences of connected pairs that have been searched for in operation S14 as illustrated in FIG. 12 are methods that affect processing of the method-under-test 31, so these methods may be determined as methods not to be stubbed.

In next operation S15, the determining unit 12 transfers methods included in the sequences of connected pairs searched for in operation S14, such as, for example, method1, method3, and method4, from the M set 22 to the not-to-be-stubbed target set 25. The determining unit 12 transfers methods remaining in the M set 22, which is method2 here, to the to-be-stubbed target set 26.

Next, in operation S16, the determining unit 12 adds methods, included in the not-to-be-stubbed target set 25, that call another method from the methods to a method-under-test set. For example, method3 is added to the method-under-test set.

Next, the determining unit 12 determines in operation S17 whether one or more methods are present in the method-under-test set. If the one or more methods are present in the method-under-test set, processing proceeds to operation S18. The determining unit 12 selects one of the one or more methods included in the method-under-test set and sets the selected method as a new method under test. For example, method3 is set as a new method under test. FIG. 16 illustrates an example of a method under test that has been newly set. In the example in FIG. 16, line numbers are indicated beside method3 (method 323). In operation S19, the determining unit 12 initializes (empties) sets other than the to-be-stubbed target set 26, after which processing returns to operation S12.

In operation S12 in which method3 is executed as the method-under-test 31, the extracting unit 11 extracts symbol variables "s" and "x" and local variable "is True", which are included in the method 323, and adds the extracted variables to the V set 21. Since methodC called from method3 does not return a user-defined object type but directly returns a value, the extracting unit 11 sets μ as a dummy variable corresponding to this value and adds μ to the V set 21. The extracting unit 11 adds methodB and methodC, which are methods directly called from method3, to the M set 22. The extracting unit 11 adds the line number of line 2, on which a conditional branch or an access to the user-defined object type returned from a method included in the M set 22 is indicated in a statement in the method-under-test 31, to the L set 23.

Figure 18:
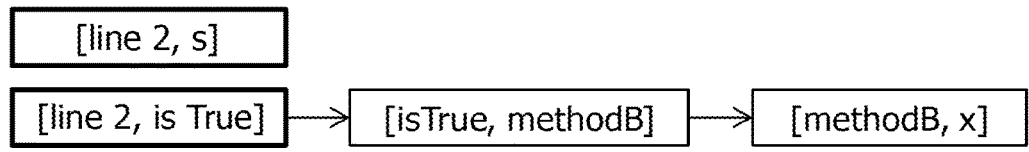
FIG. 18 illustrates an example of a sequence of connected pairs that have been searched for about the newly set method under test.
Figure 19:
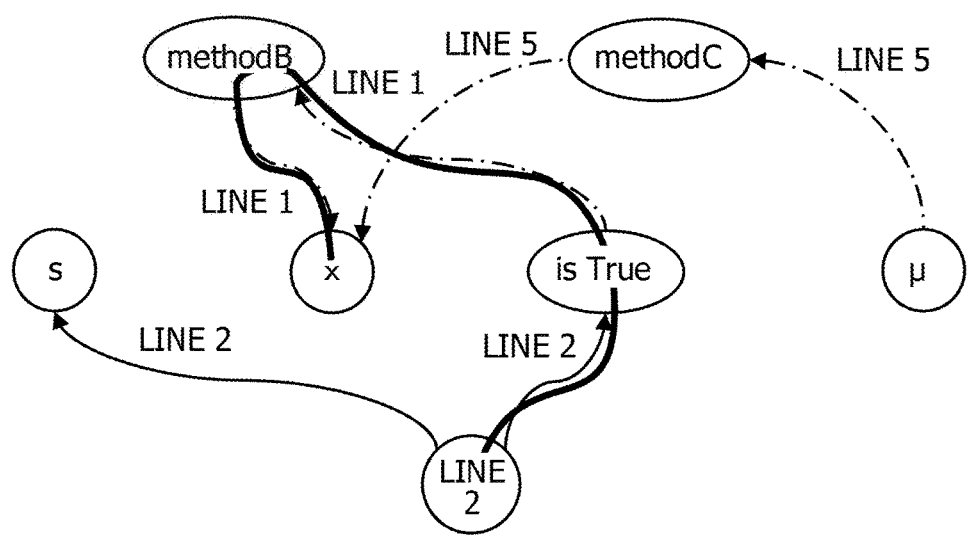
FIG. 19 is an example of a graph representing sequences of connected pairs that have been searched for about the newly set method under test.

FIG. 17 illustrates examples of pairs, in the newly set method under test, that are to be added to a VML set. FIG. 18 illustrates an example of a sequence of connected pairs that have been searched for about the newly set method under test. FIG. 19 is an example of a graph representing sequences of connected pairs that have been searched for about the newly set method under test. In operation S13, the extracting unit 11 adds the pairs illustrated in FIG. 17 to the VML set 24. In operation S14, the determining unit 12 sequentially searches, from each of the pairs included in the VML set 24, for connected pairs that start from pair [a, b] that uses line number "a" included in the L set 23 as a first element. For example, a sequence of connected pairs as illustrated in FIG. 18 is searched for. An example in which this sequence of connected pairs is represented as a graph is illustrated in FIG. 19.

In operation S15, the determining unit 12 transfers, from the M set 22 to the not-to-be-stubbed target set 25, a method, which is, for example, methodB, included in the sequence of connected pair searched for in operation S14 and transfers methodC, which remains in the M set 22, to the to-be-stubbed target set 26.

Since methodB included in the not-to-be-stubbed target set 25 does not further call another method, methodB is not added to the method-under-test set, in which case a negative result is obtained in operation S17 and processing proceeds to operation S20. In operation S20, the determining unit 12 creates the to-be-stubbed method list 35 in which information about each method included in the to-be-stubbed target set 26 is listed and outputs the to-be-stubbed method list 35. In this example, information about method2 and methodC is output as the to-be-stubbed method list 35. This completes the to-be-stubbed target determining processing.

The to-be-stubbed target determining apparatus excludes functions that return a value indicating a user-defined object accessed in a program under test or a value used as a condition of a conditional branch from functions to be stubbed. Therefore, functions that affect the program under test are determined not to be stubbed and other functions are determined to be stubbed. Functions to be stubbed may be determined so that test cases are efficiently created without lowering the code coverage of test cases.

Since functions to be stubbed are automatically determined, the entire working cost of a program test may be lowered.

As for the program under test (method-under-test 31) illustrated in FIG. 9, for example, methods directly called from the method-under-test 31 are methods to be stubbed. For example, the method 321 (method1), method 322 (method2), method 323 (method3), and method 324 (method4) are methods to be stubbed. In the to-be-stubbed target determining apparatus described above, for example, methods to be stubbed are determined to be the method 322 (method2) and method 33C (methodC).

Since, in the to-be-stubbed target determining apparatus described above, method1 is not stubbed, method1 returns both a null value and a user-defined object on line 2 in symbolic execution in which variable "s" has been symbolized. On line 3, therefore, variable "num", which is a user-defined object, is accessed. Since test execution does not fail here, test code coverage may be improved.

In the to-be-stubbed target determining apparatus described above as well, although a method called from a method to be stubbed is not stubbed, the called method is not executed during test execution. Here, methodA as well, which is called from method2 to be stubbed, is not executed. Therefore, the number of execution paths of all methods under test may be reduced and an explosive increase in paths may thereby be reduced.

A method coded in JavaScript (registered trademark) may be a program under test or may be a program coded in another language such as, for example, a program coded in an object-oriented language.

The method of determining a function not to be stubbed is not limited to the examples described above if the method can determine functions that affect a program under test according to a relationship between the program under test and functions that are called from the program under test. The relationship between the program under test and functions that are called from the program under test may be a relationship represented by the graph illustrated in FIG. 13.

The to-be-stubbed target determining program 50 may have been stored (installed) in the storage unit 43 in advance or may have been recorded in a compact disc-read-only memory (CD-ROM), a digital versatile disc (DVD) ROM (DVD-ROM), a universal serial bus (USB) memory, or another recording medium.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A to-be-stubbed target determining apparatus comprising:
a processor that executes a determining program; and
a memory that stores the determining program;
wherein according to determining program, the processor:
extracts relational information that represents a relation between a program under test and one or more functions which are called from the program under test; and determines, according to the relational information, from among the one or mode functions, a function that returns a user-defined type of instance accessed in the program under test and a function that returns a value used as a condition of a conditional branch in the program under test, as a first function excluded from functions to be stubbed, wherein, in the program under test, the processor determines, as the first function, a function obtained by performing a trace of a variable or a function related to a variable or a function that is coded on a line that indicates the access to the user-defined type of instance or execution of the conditional branch according to the relational information, wherein the processor:

executes extraction processing to extract, from one or more variables included in the program under test and the one or more functions a pair of variables that are mutually related, a pair of methods that are mutually related, a pair of a variable and a method that are mutually related, or a pair of identification information about the line and the variable or the function that is coded on the line, as one or more pairs and as the relational information;

extracts a pair that includes the identification information about the line from among the one or more pairs;

repeatedly executes the extraction processing for an extracted pair; and determines, as the first function, a function included in the one or more pairs and the extracted pair.

2. The to-be-stubbed target determining apparatus according to claim 1, wherein the processor extracts the one or more variables, the one or more functions, and the identification information and extracts each of the pairs according to a rule.

3. The to-be-stubbed target determining apparatus according to claim 1, wherein the processor:

sets a second function, which has not been extracted from functions to be stubbed, as a new program under test and extracts new relational information from the new program under test; and determines, according to the new relational information, from among one or more functions included in the new program under test, a function that returns a user-defined type of instance accessed in the new program under test and a function that returns a value used as a condition of a conditional branch in the new program under test, as the first function excluded from functions to be stubbed.

4. A to-be-stubbed target determining method comprising:

extracting, by a computer, relational information that represents a relation between a program under test and one or more functions which are called from the program under test;

determining, according to the relational information, from among the one or mode functions, a function that returns a user-defined type of instance accessed in the program under test and a function that returns a value used as a condition of a conditional branch in the program under test, as a first function excluded from functions to be stubbed;

determining, in the program under test, a function obtained by performing a trace of a variable or a function related to a variable or a function that is coded on a line that indicates the access to the user-defined type of instance or execution of the conditional branch according to the relational information as the first function;

executing extraction processing to extract, from one or more variables included in the program under test and the one or more functions a pair of variables that are mutually related, a pair of methods that are mutually related, a pair of a variable and a method that are mutually related, or a pair of identification information about the line and the variable or the function that is coded on the line, as one or more pairs and as the relational information;

extracting a pair that includes the identification information about the line from among the one or more pairs;

repeatedly executing the extraction processing for an extracted pair; and determining, as the first function, a function included in the one or more pairs and the extracted pair.

5. The to-be-stubbed target determining method according to claim 4, further comprising:

extracting the one or more variables, the one or more functions, and the identification information; and extracting each of the pairs according to a rule.

6. The to-be-stubbed target determining method according to claim 4, further comprising:

setting a second function, which has not been extracted from functions to be stubbed, as a new program under test and extracts new relational information from the new program under test; and determining, according to the new relational information, from among one or more functions included in the new program under test, a function that returns a user-defined type of instance accessed in the new program under test and a function that returns a value used as a condition of a conditional branch in the new program under test, as the first function excluded from functions to be stubbed.

7. A non-transitory recording medium storing to-be-stubbed target determining program to be executed by a computer, the to-be-stubbed target determining program causing the computer to perform operations of:

extracting relational information that represents a relation between a program under test and one or more functions which are called from the program under test; and determining, according to the relational information, from among the one or mode functions, a function that returns a user-defined type of instance accessed in the program under test and a function that returns a value used as a condition of a conditional branch in the program under test, as a first function excluded from functions to be stubbed;

determining, in the program under test, a function obtained by performing a trace of a variable or a function related to a variable or a function that is coded on a line that indicates the access to the user-defined type of instance or execution of the conditional branch according to the relational information as the first function;

executing extraction processing to extract, from one or more variables included in the program under test and the one or more functions a pair of variables that are mutually related, a pair of methods that are mutually related, a pair of a variable and a method that are mutually related, or a pair of identification information about the line and the variable or the function that is coded on the line, as one or more pairs and as the relational information;

extracting a pair that includes the identification information about the line from among the one or more pairs;

repeatedly executing the extraction processing for an extracted pair; and determining, as the first function, a function included in the one or more pairs and the extracted pair.

8. The non-transitory recording medium according to claim 7, further comprising:

extracting the one or more variables, the one or more functions, and the identification information; and extracting each of the pairs according to a rule.

9. The non-transitory recording medium according to claim 7, further comprising:

setting a second function, which has not been extracted from functions to be stubbed, as a new program under test and extracts new relational information from the new program under test; and determining, according to the new relational information, from among one or more functions included in the new program under test, a function that returns a user-defined type of instance accessed in the new program under test and a function that returns a value used as a condition of a conditional branch in the new program under test, as the first function excluded from functions to be stubbed.

* * * * *